(12) United States Patent
Yamagiwa (10) Patent No.: US 6,729,451 B2
(45) Date of Patent: May 4, 2004

(54) SHOCK ABSORBER FOR A TWO-WHEELED VEHICLE

(75) Inventor: Toshio Yamagiwa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/207,957

(22) Filed: Jul. 31, 2002

(65) Prior Publication Data

US 2003/0057719 A1 Mar. 27, 2003

(30) Foreign Application Priority Data

Aug. 7, 2001 (JP) ........................... 2001-239982

(51) Int. Cl.$^7$ ............................................. B60R 21/04
(52) U.S. Cl. .................... 188/377; 188/378; 293/105
(58) Field of Search .............................. 188/371–378; 267/140; 280/748, 751, 752; 296/146.6, 188.03, 189.09; 293/102, 105, 109, 110, 120

(56) References Cited

U.S. PATENT DOCUMENTS

| | | | | |
|---|---|---|---|---|
| 5,806,889 A | * | 9/1998 | Suzuki et al. | 280/748 |
| 5,857,702 A | * | 1/1999 | Suga et al. | 280/751 |
| 6,099,055 A | * | 8/2000 | Hirota et al. | 293/120 |
| 6,540,275 B1 | * | 4/2003 | Iwamoto et al. | 293/109 |
| 2003/0030290 A1 | * | 2/2003 | Yamagiwa | 293/105 |

FOREIGN PATENT DOCUMENTS

| | | |
|---|---|---|
| JP | 8-164810 A | 6/1996 |
| JP | 2978083 | 9/1999 |

* cited by examiner

Primary Examiner—Christopher P. Schwartz
(74) Attorney, Agent, or Firm—Birch, Stewart, Kolasch & Birch, LLP (57) ABSTRACT

A shock absorber for a two-wheeled vehicle that can absorb large energy generated in case of a collision effectively is easily mounted on the two-wheeled vehicle. A tabular top board and a lattice body are provided including a plurality of plate ribs being reduced in thickness from the proximal ends toward the distal ends and molded integrally with the top board so as to project upwardly thereon and intersectionally with respect to each other. Shock absorbing members of synthetic resin include projecting rib portions that are formed at outermost lattice openings So of the lattice body by extending some of the plate ribs that are disposed intersectionally with respect to each other outwardly and having the top board overhanging outwardly of the outermost lattice openings of the lattice body are disposed in such a manner that the direction of the plate ribs extending from the proximal ends toward the distal ends is oriented along the fore-and-aft direction of the two-wheeled vehicle. The plate ribs are stacked in such a manner that the distal ends of the plate ribs abut against the top board of the shock absorbing member to be disposed adjacent thereof, and then mounted at the front end of the two-wheeled vehicle.

20 Claims, 10 Drawing Sheets

SHOCK ABSORBER FOR A TWO-WHEELED VEHICLE

CROSS-REFERENCE TO RELATED APPLICATIONS

The present application claims priority under 35 USC 119 to Japanese Patent Application No. 2001-239982 filed on Aug. 7, 2001 the entire contents thereof is hereby incorporated by reference.

BACKGROUND OF THE INVENTION

1. Field of the Invention

The present invention relates to a shock absorber for a two-wheeled vehicle for effectively protecting an occupant against a frontal crash of a two-wheeled vehicle.

2. Description of the Background Art

A shock absorber is used in an automotive vehicle for protecting occupants in case of a collision. For example, shock absorbers are provided inside of pillar garnishes for protecting the heads of the occupants and inside of the door trims for protecting the backs or the chests of the occupants and the like in case of a side collision. A shock absorber with resin ribs can be manufactured at relatively low cost and has been in heavy usage as set forth in JP-A-8-164810, JP 2978083, etc.

However, with regard to two-wheeled vehicles the absorption of energy in case of a collision has not been examined so far.

The shock absorber for a two-wheeled vehicle is required to absorb a much larger energy in comparison with that for an automotive vehicle. For example, in the case of an automotive vehicle, kinetic energy to be absorbed $Ek=\frac{1}{2} mv^2$ is 102.1 [J], which is determined based on energy generated when a dummy head of 4.54 kg in mass clashes at the speed of 15 mile/hr. (=6.71 m/s), while in the case of a two-wheeled vehicle, kinetic energy to be absorbed Ek is 9646 [J], where the vehicle mass is 100 kg, and the traveling velocity is 50 km/hr. (=13.89 m/s), which means that incommensurably large energy absorption must be realized.

Assuming that a resin rib for an automotive vehicle is used, since the height of the rib is in the order of 60 mm at most, a considerably large area is required on the two-wheeled vehicle when it, having the same absorption stroke, is applied thereto, which is actually impossible. Because the shock absorber is to be mounted at the front end of the two-wheeled vehicle, it was impossible to enlarge the front area thereof. On the other hand, assuming that a method of increasing the height of resin rib is employed, the rib may be ever-increasingly thicker because it is necessary to provide a draft angle for manufacturing reasons, thereby resulting in a disadvantage in that a generated load increases.

SUMMARY AND OBJECTS OF THE INVENTION

In order to solve the aforementioned problems, it is an object of the present invention to provide a shock absorber for a two-wheeled vehicle that effectively absorbs a large energy generated in case of a collision and that may be easily mounted on a two-wheeled vehicle.

In order to achieve the aforementioned object the present invention is directed to a shock absorber for a two-wheeled vehicle that includes a tabular top board, and a lattice body including a plurality of plate ribs being reduced in thickness from the proximal ends toward the distal ends and molded integrally with the top board so as to project upwardly thereon and intersectionally with respect to each other. Shock absorbing members of synthetic resin having projecting rib portions formed at outermost lattice openings of the lattice body by extending some of the plate ribs that are disposed intersectionally with respect to each other outwardly and having the top board overhanging outwardly of the outermost lattice openings of the lattice body are disposed in such a manner that the direction of the plate ribs extending from the proximal ends toward the distal ends is oriented along the fore-and-aft direction of the two-wheeled vehicle, stacked in such a manner that the distal ends of the plate ribs abut against the top board of the shock absorbing member to be disposed adjacent thereof, and then mounted at the front end of the two-wheeled vehicle.

The shock absorber for a two-wheeled vehicle according to the present invention includes the lattice opening at the center of the lattice body that is made larger than the lattice openings formed on the portion other than the center.

According to the present invention, when the lattice body is disposed in such a manner that the direction of the plate ribs extending from the proximal end towards the distal end is oriented along the fore-and-aft direction of the two-wheeled vehicle, stacked in such a manner that the distal ends of the plate ribs abut against the top board of the shock absorbing member to be disposed adjacent thereof, and then mounted at the front end of the two-wheeled vehicle, stacking of lattice bodies contributes to secure a large shock absorbing stroke for a frontal collision of the two-wheel vehicle, thereby being able to absorb a large impact as desired. In addition, since the shock absorbing members are stacked, the height of the plate rib in the lattice body, which constitutes each tier, may be reduced to a value in the order of 60 mm, so that the proximal end of the rib is prevented from being too thick even when a draft angle is provided. Thus, disadvantages such as an increase in the generated load may not arise.

Further, when shock absorbing members of synthetic resin having projecting rib portions are formed at outermost lattice openings of the lattice body by extending at least one of the plate ribs that are disposed intersectionally with respect to each other outwardly and when the top board overhanging outwardly of the outermost lattice openings of the lattice body is used, a stack of individual shock absorbing members may be prevented from being off balance when being subjected to an impact load, and the plate ribs constituting the shock absorbing member being crushed while being buckled and deformed evenly as a whole, thereby absorbing the impact load effectively.

Furthermore, when the shock absorbing members including the lattice body and the top board molded integrally with each other are stacked, when each of stacked shock absorbing members is subjected to a impact load, the top board receives the load as a whole in a first position, and then the load is transmitted to each plate rib, and then the plate ribs are crushed continuously to absorb the impact load effectively.

According to the present invention, when the lattice opening at the center of the lattice body is determined to be larger than the lattice opening located on the portion other than the center, the strength of the shock absorber formed by stacking the shock absorbing members is low at the portion near the central axis, and thus it is crushed stably when being subjected to a impact load.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A shock absorber for a two-wheeled vehicle of the present invention (hereinafter, referred to simply as "shock absorber") will now be described in detail. FIG. 1 to FIG. 12 show one embodiment of the shock absorber according to the present invention. The hollow arrows represent the direction of the impact load throughout the figures.

The shock absorber comprises a lattice body 2 and a top board 3, and is formed by integrally molding both the lattice body 2 and the top board 3 by injection molding or the like to form shock absorbing members 1 of synthetic resin and stacking the same. The resin material employed for forming the shock absorbing member 1 includes thermoplastic resin such as PP, PPF, ABS, PC/ABS (alloy of polycarbonate and ABS), and the like. The shock absorber in FIG. 1 includes the shock absorbing members 1 stacked in a six-tier construction, oriented horizontally, and mounted at the front end of the two-wheeled vehicle 9.

The lattice body 2 is a primary portion of the shock absorbing member 1 formed by disposing plate ribs 2a intersectionally with respect to each other to form a lattice. The lattice body 2 includes a plurality of plate ribs 2a formed integrally with the top board 3 so as to be reduced in thickness gradually from the proximal end 21 to the distal end 22 and disposed intersectionally with respect to each other. Each of the plate ribs 2a is provided to extend upwardly on the top board 3.

Figure 4:
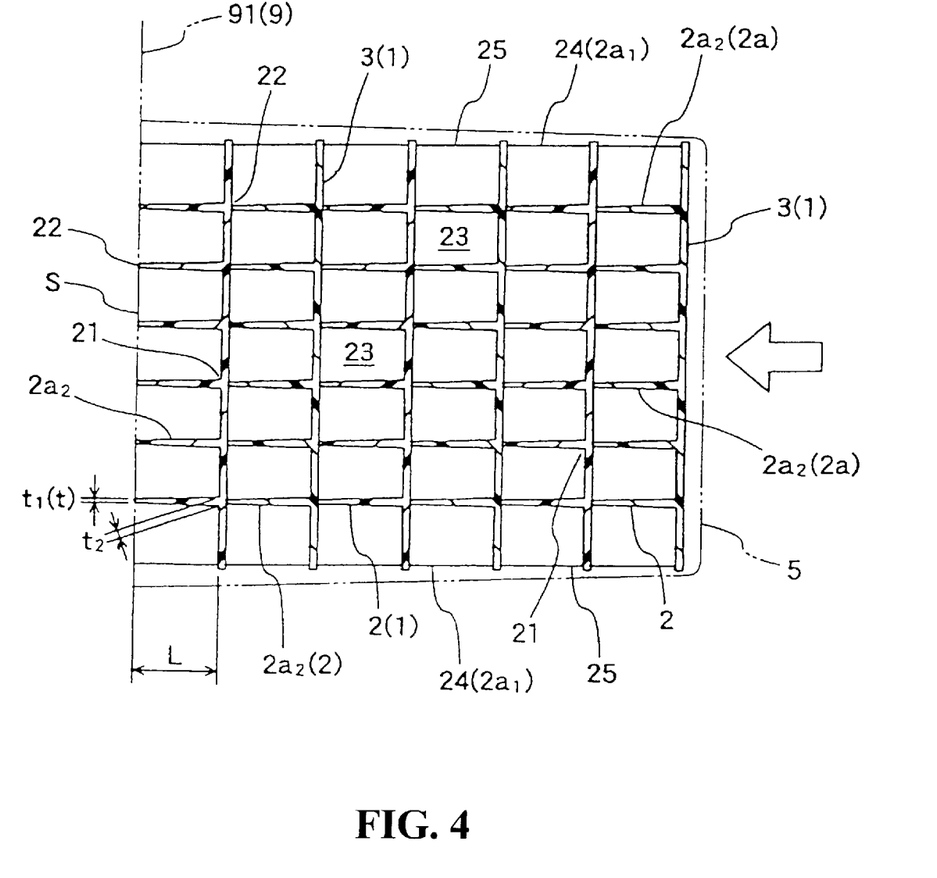
FIG. 4 is a vertical cross-sectional view of the shock absorber in FIG. 1.

The lattice body 2 is formed so as to be capable of being buckled or deformed easily by an external force exerted in case of a collision, so that it exercises a shock absorbing capability for absorbing the impact of the collision. As shown in FIG. 4, each plate rib 2a constructing the lattice body 2 has a tapered configuration having a smaller thickness $t_1$ at the distal end 22 in comparison with a thickness $t_2$ at the proximal end 21, so that the thickness t of the lattice body 2 decreases gradually toward the distal end 22. When an impact load is exerted, buckling and deformation proceeds gradually from the distal end portion 22 of the lattice body 2 that is low in strength so that the impact pressure is effectively absorbed. In addition, by stacking the lattice bodies 2, the impact load can be absorbed more effectively. Though vertical ribs $2a_1$ and lateral ribs $2a_2$ of the plate ribs 2a forming a lattice are the plates having the same configuration in this embodiment, the thickness and the like of the vertical ribs $2a_1$ and the lateral ribs $2a_2$ can be selected separately as needed.

Figure 1:
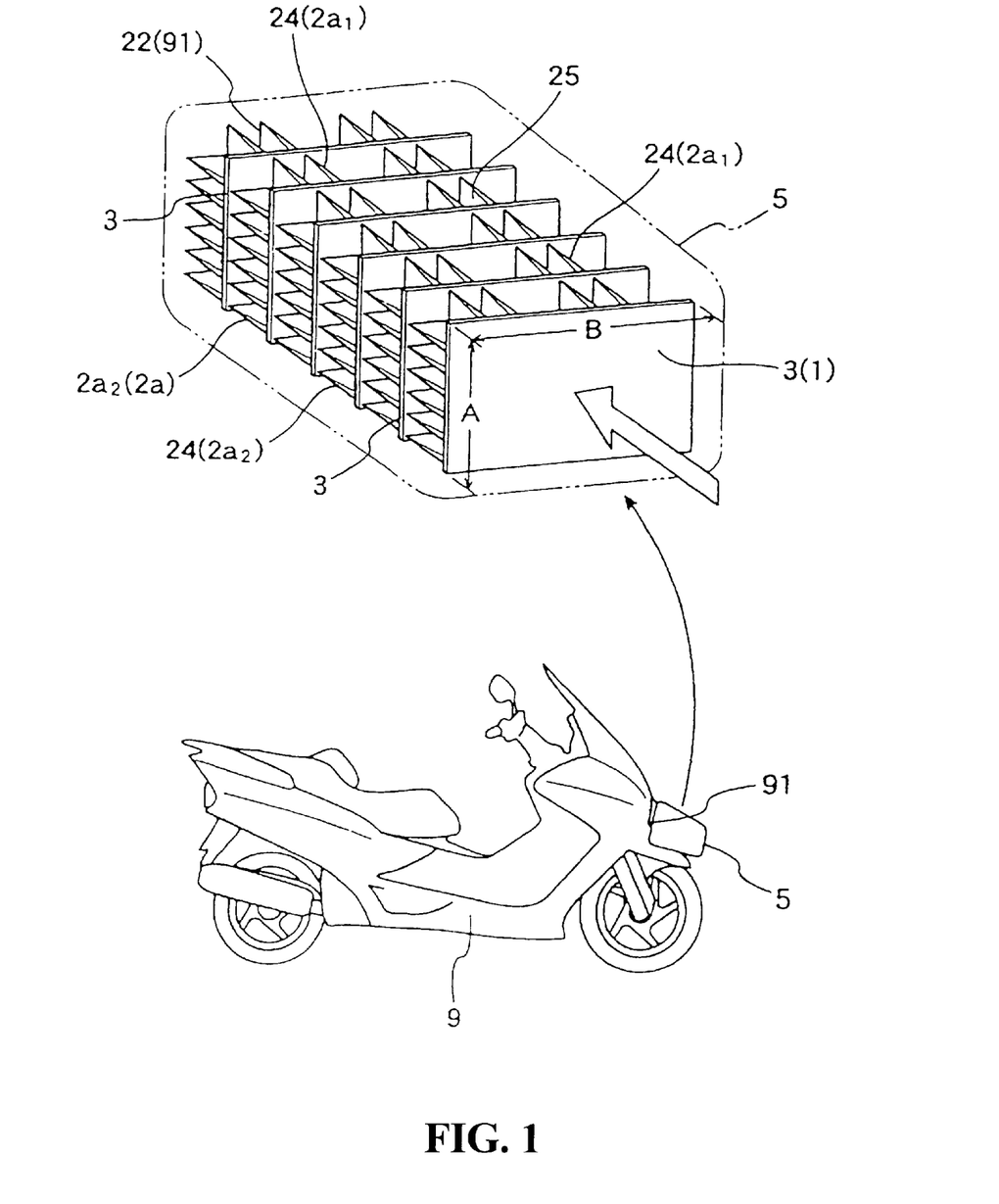
FIG. 1 is an explanatory perspective view illustrating a shock absorber mounted on a two-wheeled vehicle according to one embodiment of the shock absorber of the present invention.

With effective shock absorption taken into consideration, the plate rib 2a forming the lattice body 2 preferably has a height L in the range between 30 mm–60 mm, a thickness $t_1$ of the distal end 22 in the range between 0.5 mm–1.0 mm, the thickness $t_2$ of the proximal end 21 in the range between 1.0 mm–2.5 mm. The dimensions of the lattice body 2 itself are such that the vertical dimension A is in the order of 140 mm, the lateral dimension B is in the order of 200 mm, the height is 30 mm–60 mm as described above, and the pitches of the plate ribs 2a forming the lattice spaces 23 are in the order of 20 mm–30 mm. The shock absorbing members 1 are horizontally stacked into a several-tier construction in such a manner that the distal ends 22 of the plate ribs 2a abut against the top board 3 of the shock absorbing member 1 that is to be disposed adjacent thereof, and as shown in FIG. 1 and FIG. 4, it is mounted at the front end of the two-wheeled vehicle 9 in a state of being covered by a cover 5.

Figure 3:
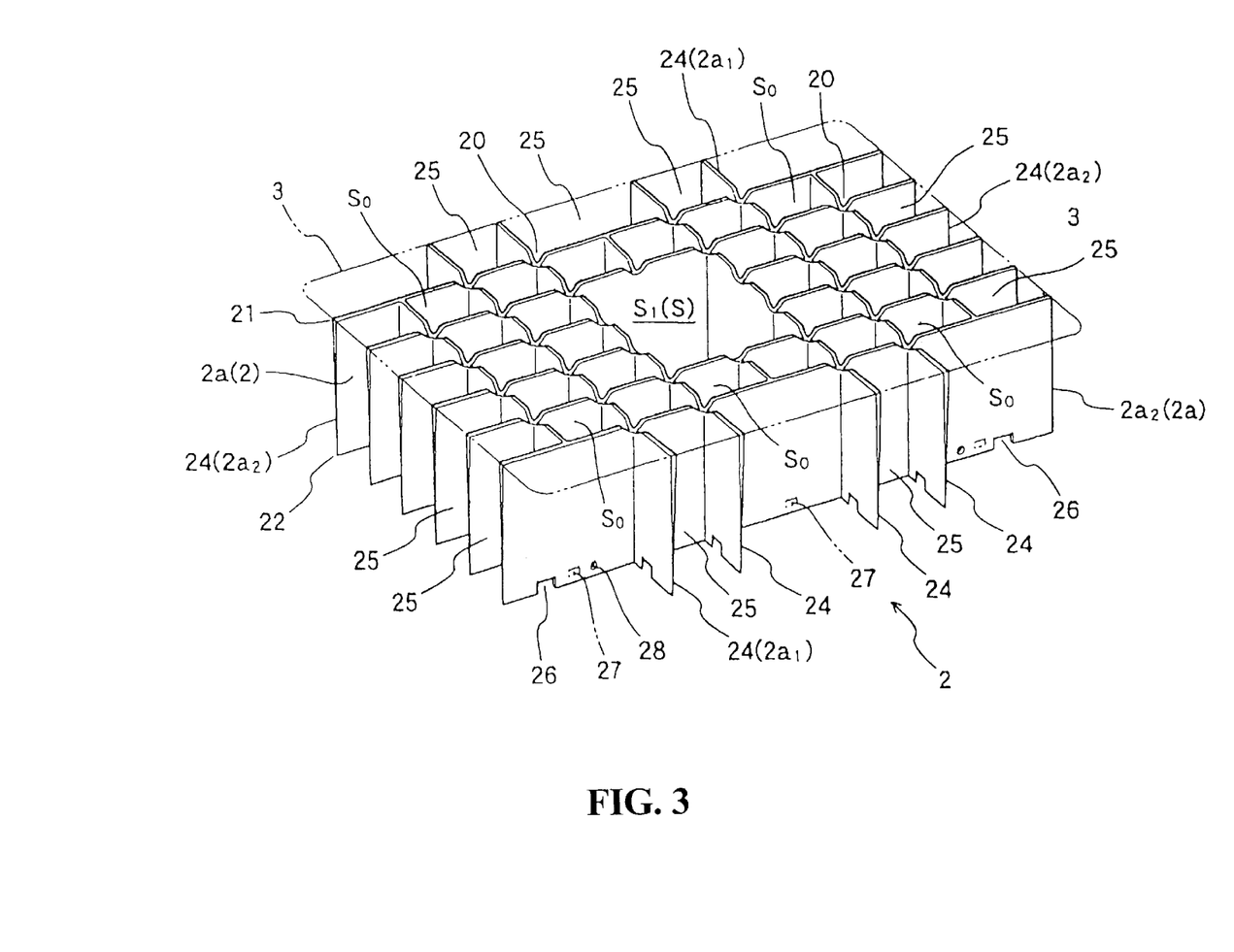
FIG. 3 is a perspective view of the shock absorbing member in FIG. 2 showing a part of a lattice body with a top board removed.

The lattice body 2 is formed with projecting rib portions 24 being formed at outermost lattice openings by extending some of the plate ribs that are disposed intersectionally with respect to each other outwardly (FIG. 3). The outermost lattice openings So of the lattice body designates the lattice openings at the positions shown with dots in FIG. 5 out of the lattice openings S.

Figure 8A:
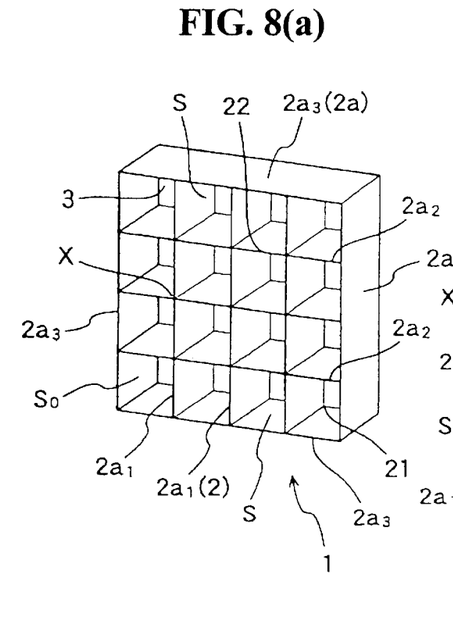
FIG. 8 is a perspective view of a specimen.
Figure 8B:
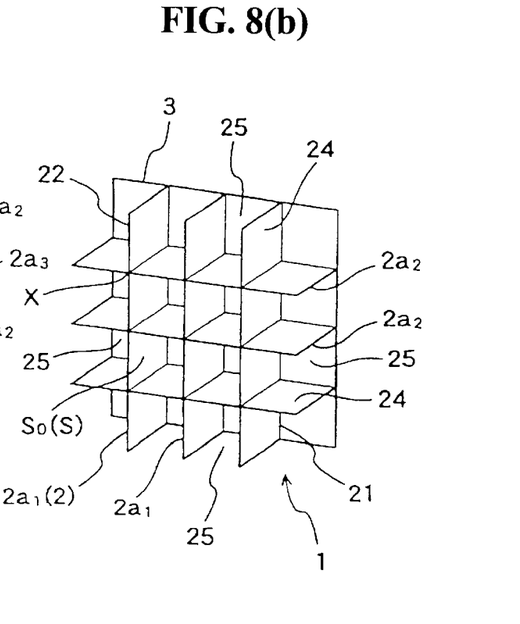

When forming the lattice by disposing the plate ribs 2a intersectionally with each other, the lattice body may be made in such a manner that all the plate ribs 2a are concerned in forming the lattice openings S as shown in FIG. 8(a). Therefore, in the lattice body of the present invention, the plate ribs 2a that correspond to the plate ribs for the outer peripheral wall $2a_3$ forming the outermost lattice openings So in FIG. 8(a) are eliminated and thus no lattice opening S is formed at the outermost positions, so that the outside is maintained in the opened state 25 as shown in FIG. 8(b). Seen from another standpoint, in the outermost lattice openings So of the lattice body, the plate ribs 2a form projecting rib portions 24 projecting outwardly from the intersections X of the lattice like a double-cross. In the present invention, though the shock absorbing members 1 are stacked and used as a shock absorber, the plate ribs $2a_3$ for the outer peripheral wall are eliminated so that the shock absorbing member 1 can be stably crushed when being subjected to a impact load. From the broader concept, the present invention is intended to allow the shock absorbing member 1 to be stably crushed when being subjected to an impact load by providing projecting rib portions 24 extending outwardly from the intersections X of some of the plate ribs 2a disposed intersectionally with respect to each other at the lattice openings So at the outermost positions of the lattice body.

Figure 14A:
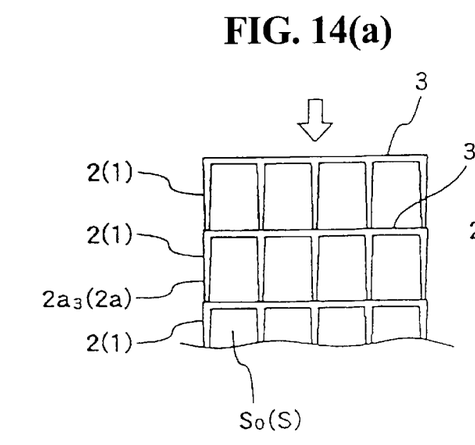
FIG. 14 is an explanatory drawing illustrating disadvantages that occur in the case where the lattice body having the outer peripheral wall is employed.
Figure 14B:
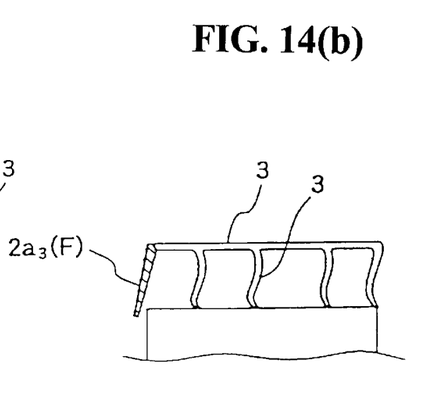

For example, when the stacked shock absorbing members 1 having the outer peripheral walls $2a_3$ of the plate ribs 2a around the lattice bodies are used as the shock absorber, the plate ribs 2a absorb energy by being buckled and deformed by the impact (FIG. 14(a)), but the outermost plate ribs 2a (outer peripheral walls $2a_3$) may be moved outwardly of the shock absorbing member 1 positioned below thereof and thus move outwardly and drop-off therefrom (FIG. 14(b)). Each shock absorbing member 1 is fixed by means of adhesives or the like, it may be disconnected when being subjected to a large impact. When the outer peripheral walls $2a_3$ is dropped off, the strength balance may be impaired, and thus it is crushed in a slanted manner, thereby impairing stability of generated loads. In addition, the slanted plate rib 2a may be sprung off. Such disadvantageous may be solved by forming the projecting rib portions 24 on the lattice openings So at the outermost positions of the lattice body by removing the outer peripheral walls $2a_3$, so that it crushes in a well-balanced posture and absorbs the impact effectively even when being subjected to a large impact.

In FIG. 8(b), all of four lattice openings S are the lattice openings So located at the outermost positions, and thus both of the two plate ribs 2a disposed intersectionally with each other at the corner of each lattice opening S form the projecting rib portions 24. In the shock absorbing member 1 in the present invention, however, as shown in FIG. 3, it is sufficient that only one of the two plate ribs 2a that intersect with each other at the outermost lattice opening So extends from the intersection X to form the projecting rib portion 24. As a matter of course, it is not necessary that the projecting rib portions 24 extend from every outermost lattice openings So as described above, and even when some of the projecting rib portions 24 are eliminated from the intersections forming the outermost lattice openings So, no special difference in the effect of the present invention was observed and thus it is also included in the scope of the present invention.

Figure 11A:
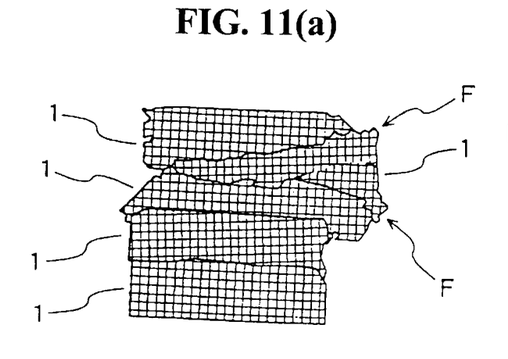
FIG. 11 is an explanatory drawing showing the progress of the shock absorption.
Figure 11B:
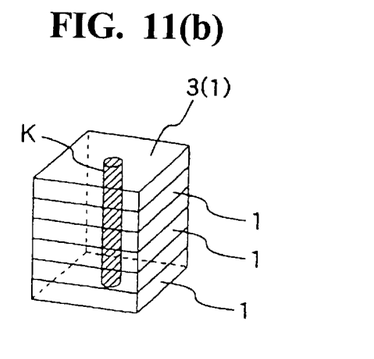

In addition, in the present invention, the lattice opening S located at the center of the lattice body 2 is made larger than those located on the portion other than the center. The present invention is a shock absorber comprising shock absorbing members 1 (lattice bodies 2) stacked one on another. The outer plate ribs 2a of the lattice body 2 can be relieved outwardly when being deformed, but those located near the center of the lattice body 2 have their relief cut-off. The center portion of the lattice body 2 is hard and the outer portion thereof is flexible. When the lattice body 2 is crushed by being compressed evenly, there arise no problem when crushing only one tier of the shock absorbing member 1. However, in the case of the shock absorbing member 1 stacked in a multiple-tier construction, the central portion positioned in the mid-tier remains (FIG. 11). When any one of the outer plate ribs 2a is crushed precedently, the lattice body 2 tends to incline toward the crushed plate rib, and the inclined lattice body 2 is pushed outwardly of the stacked portion by the front and rear plate ribs 2a. The plate rib F that was sprung outward cannot be crushed, which results in that it cannot absorb energy (FIG. 11(a)). Therefore, it is constructed so as to be crushed stably by weakening the center K of the lattice body 2 intentionally (FIG. 11(b)), or by making the lattice opening $S_1$ at the center of the lattice body 2 larger than the lattice openings S located on the portion other than the center.

Figure 5A:
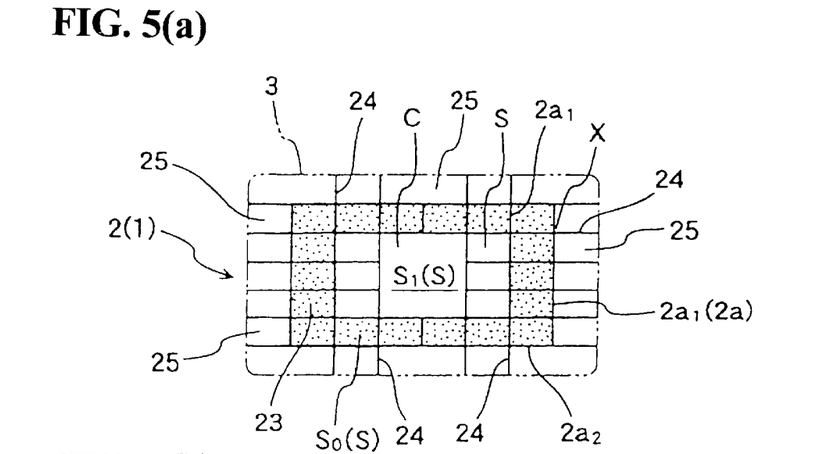
FIG. 5 is a plan view of the shock absorbing member.
Figure 5B:
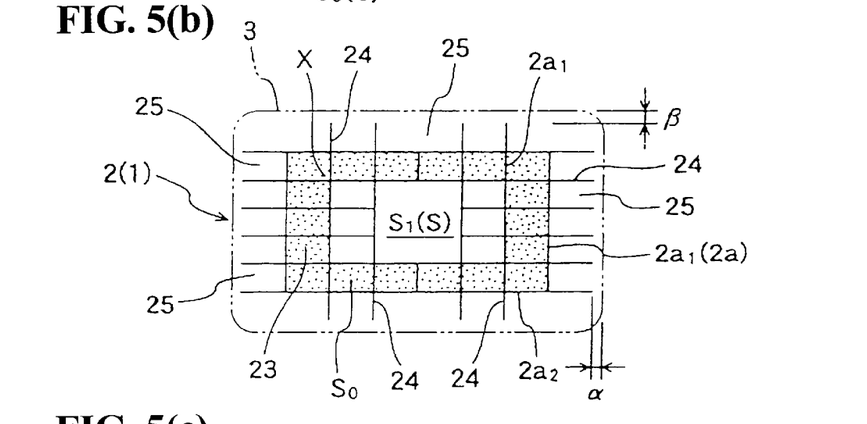
Figure 5C:
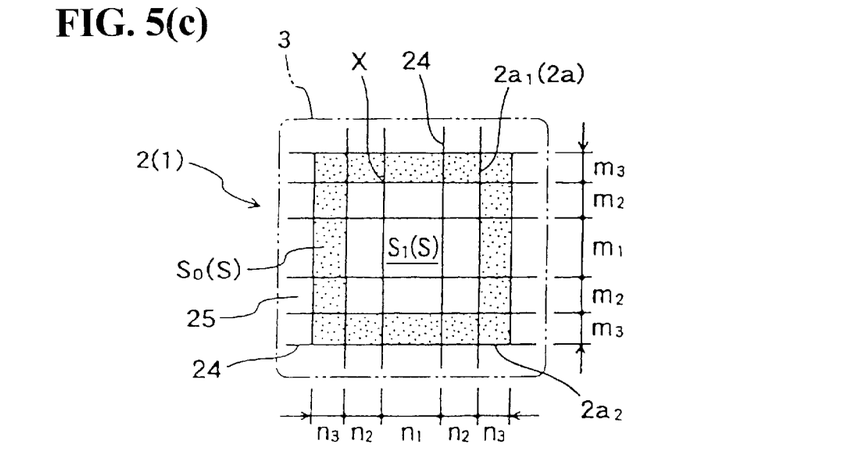
Figure 6A:
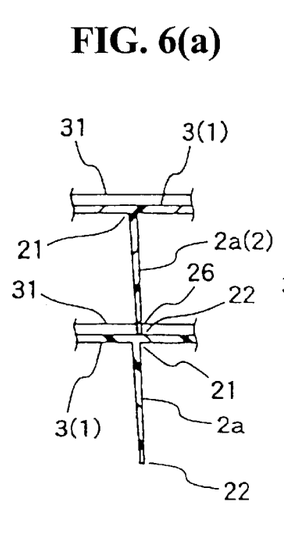
FIG. 6 is a partially enlarged view of a locking mechanism between the lattice body and the adjacent top board.
Figure 6B:
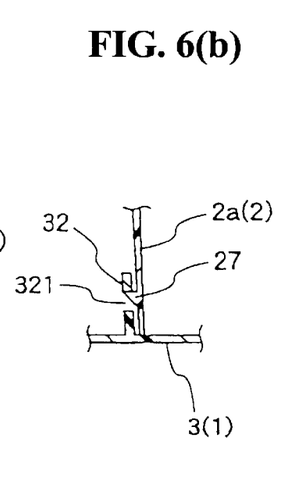
Figure 6C:
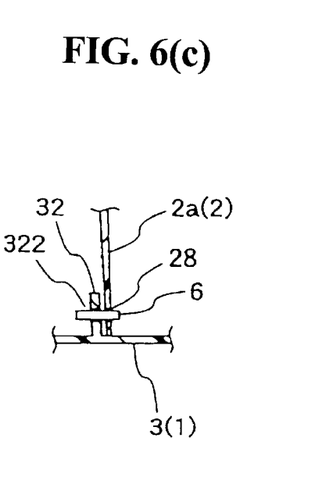

Making the lattice opening $S_1$ at the center of the lattice body 2 larger than the lattice opening S located on the portion other than the center is achieved, for example, by making a lattice body 2 having a part of the plate ribs 2a positioned in the central area C thinned out as shown in FIGS. 5(a) and (b) when forming the lattice body 2 by disposing a plurality of plate ribs 2a intersectionally with respect to each other, or by increasing the pitches of the vertical ribs 2a, toward the center of the lattice body 2 as shown by . . . , $n_3$, $n_2$, $n_1$, and increasing the pitches of the lateral ribs $2a_2$ as shown by . . . , $m_3$, $m_2$, $m_1$ as shown in FIG. 5(c) so that the lattice opening $S_1$ at the center of the lattice body 2 becomes larger than the lattice openings S located on the portion other than the center.

The top board 3 is tabular body and formed integrally with the lattice body 2 in such a manner that the top board 3 covers the opening surface of the lattice on the proximal side 21 formed by the lattice ribs 2a. The top board 3 forms the shock absorbing member 1 integrally with the lattice body 2 having plate ribs 2a uprising from the top board 3 so as to be decreased in thickness t gradually from the proximal end 21 to the distal end 22 and being disposed intersectionally. The top board 3 is mounted on the front end 91 of the two-wheeled vehicle with the top board 3 facing in the direction of frontal collision and the lattice openings S of the respective shock absorbing member 1 facing rearwardly of the vehicle (FIG. 4).

The top board 3 is sized so that it overhangs outwardly of the outermost lattice openings So of the lattice body. With the top board 3 overhanging outwardly of the outermost lattice openings So, when the shock absorber is subjected to an impact load, the top board 3 receives the load as a whole in a first position, and then the load can be dispersed to the respective plate ribs 2a of the lattice body 2. The shock absorber of the present embodiment extends from the outermost lattice openings So by approximately 30 mm, and thus is sized as shown in FIG. 5(a) that corresponds to the length of the projecting rib portion 24. As a matter of course, the vertical and lateral lengths of the top board 3 may be such that they overhang outwardly of the distal ends of the projecting rib portions 24 by the dimensions of $\alpha$ and $\beta$, as shown in FIG. 5(b). The thickness of the top board 3 is required to be such that it has rigidity to some extent so as to be capable of receiving the impact in a whole area. In this case, the top board 3 having a thickness of 2 mm is employed. It is also possible to enforce it by providing a flange for securing its rigidity as needed.

Figure 2:
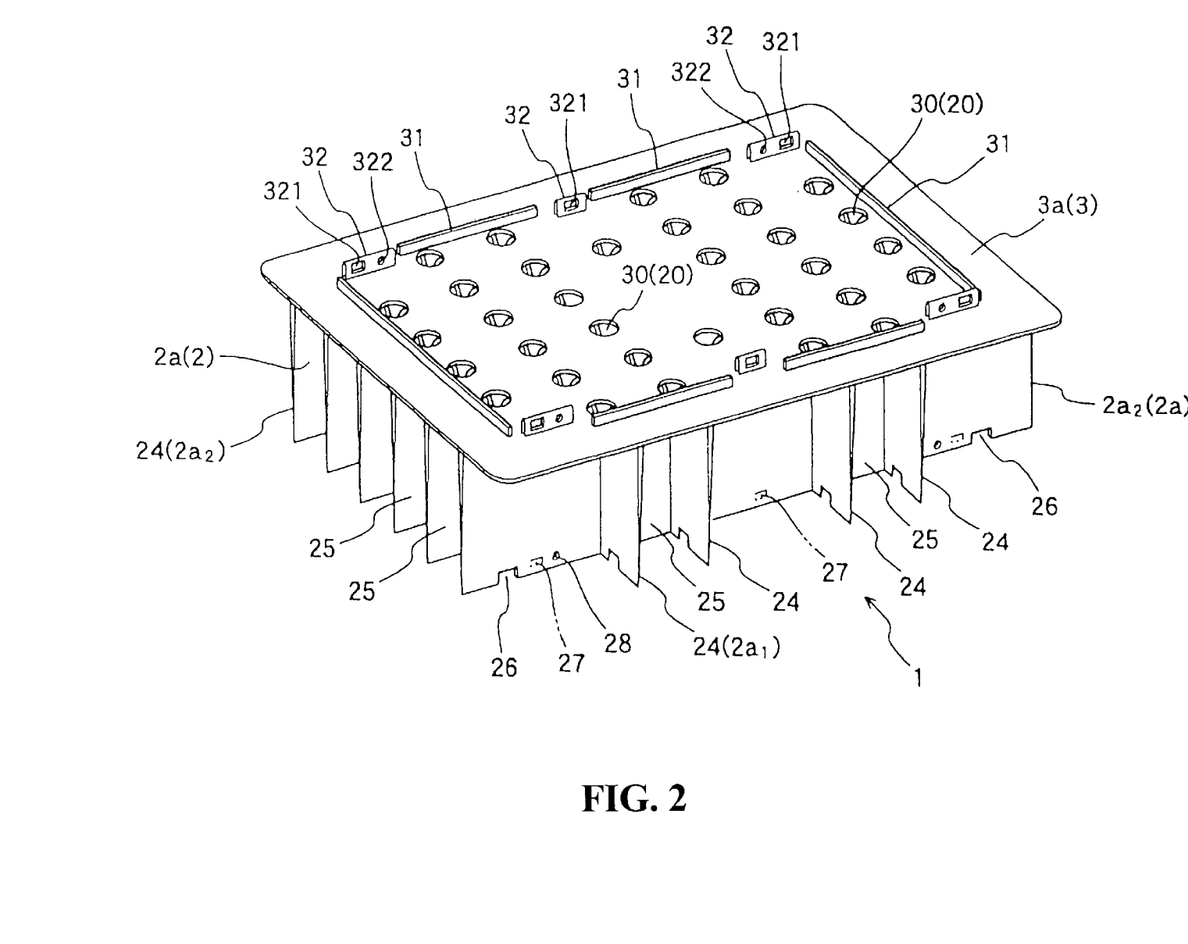
FIG. 2 is a perspective view of the shock absorbing member constituting the shock absorber.

The shock absorbing member 1 of the present embodiment is further provided with a recessed notch 20 at the proximal portion 21 of the intersections X of the lattice body 2 and circular holes 30 on the side of the top board 3 at the positions corresponding thereto to form relieves (FIG. 2, FIG. 3). The provision of relieves may prevent an increase in a load from being generated at the last stage when being subjected to an impact load.

In the shock absorber of the present invention, the shock absorbing members 1, is disposed in such a manner that the direction of the plate ribs 2a extending from the proximal end 21 towards the distal end 22 are oriented along the fore-and-aft direction of the two-wheeled vehicle, stacked in such a manner that the distal ends 22 of the plate ribs 2a abut against the top board 3 of the shock absorbing member 1 to be disposed adjacent thereof. The shock absorber is mounted at the front end of the two-wheeled vehicle and is provided with a locking mechanism for preventing the stacked shock absorbing members 1 from being misaligned accidentally by an impact load. The front surface 3a of the top board is provided with a weir 31 and the lower edge of the plate rib 2a is formed with a notch 26. When the shock absorbing members 1 are stacked and formed into a shock absorber, the weir 31 is fitted in the notch 26 of the shock absorbing member 1 on the upper tier (FIG. 6(a)). The front surface 3a of the top board is provided with projecting strips 32 extending upwardly at the appropriate positions, and each of the projecting strips 32 is formed with a square hole 321 and/or a round hole 322 and the lattice body 2 is formed with projecting claws 27 and/or through holes 28. When the shock absorbing members 1 are stacked and formed into a shock absorber, the stacked shock absorbing members 1 are prevented from being misaligned by fitting the projecting claw 27 in the square hole 321 (FIG. 6(b)), and inserting a pin 6 through the round hole 322 and the through hole 28 (FIG. 6(c)). Other fitting mechanisms or some other measures such as adhesion, heat welding and clip-on may be employed without employing such a locking mechanism as described above.

Figure 7:
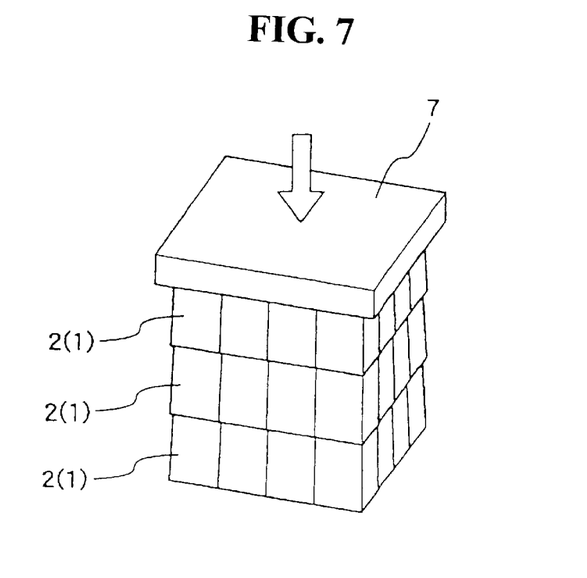
FIG. 7 is a perspective view showing the progress of the test on the shock absorber.

The performance comparative test conducted on the projecting rib portions 24 will be described. The inventors of the present invention formed shock absorbers of a three-tier construction using the specimens shown in FIGS. 8(a) and (b) respectively, and conducted a test in which an impact load (hollow arrow) is exerted as shown in FIG. 7. A shock receiving plate 7 is illustrated in FIG. 7.

Figure 9A:
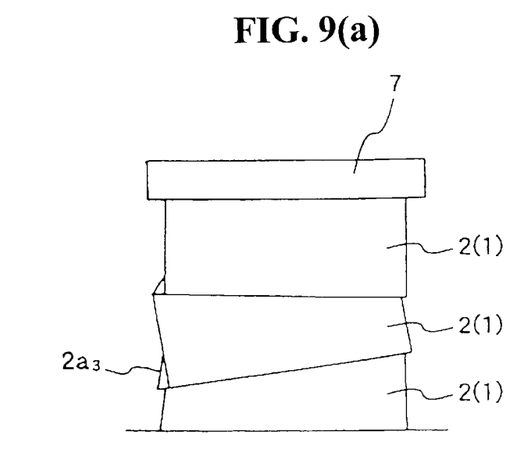
FIG. 9 is an explanatory drawing showing the progress of the shock absorption of the specimen.
Figure 9B:
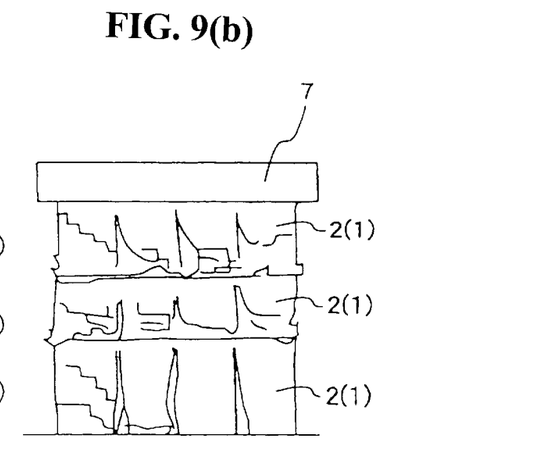

By an impact load exerted thereon, the plate rib 2a of the shock absorber is buckled and deformed for absorbing the impact load. In the case of the specimen shown in FIG. 8(a), since the plate ribs $2a_3$ for the outer peripheral walls were easily relieved and thus dropped off as shown in FIG. 9(a), it could not be stably crushed due to a lack of balance. In contrast thereto, it was recognized that the specimen shown in FIG. 8(b) having the plate ribs corresponding to the plate ribs $2a_3$ for the outer peripheral walls forming the outermost lattice openings So shown in FIG. 8(a) eliminated was stably crushed as shown in FIG. 9(b). It was also recognized that the specimen was stably crushed even when the lattice body from which some of the projecting rib portions 24 were eliminated at the outermost lattice openings So was used, if there were more than four lattice openings S.

Figure 10:
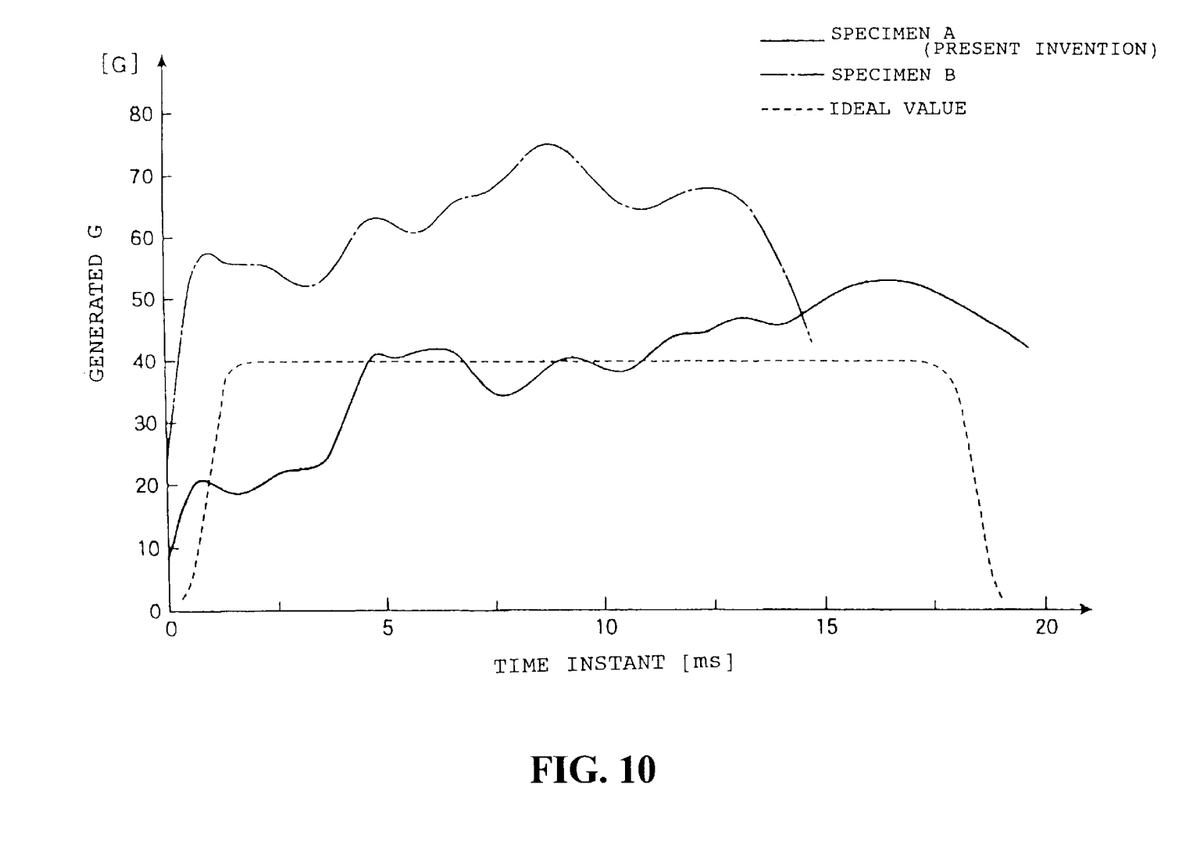
FIG. 10 is a graph of loads generated on the specimen with respect to the time instants.

FIG. 10 shows test data on generated G (gravity) with respect to the time instance on the shock absorber using the specimens in FIGS. 8(a) and 8(b). The specimen in a three-tier construction shown in FIG. 8(b) is the specimen A (of the present invention), and the specimen in a three-tier construction shown in FIG. 8(a) is the specimen B. It is appreciated from the graph shown in FIG. 10 that the specimen A with the plate ribs $2a_3$ for the outer peripheral wall for forming the outermost lattice openings So eliminated, that is, the lattice body (shock absorbing member 1) formed with projecting rib portions 24 is in the state of being closer to the ideal value, and is able to absorb the impact load continuously while stabilizing the generated G.

Figure 12A:
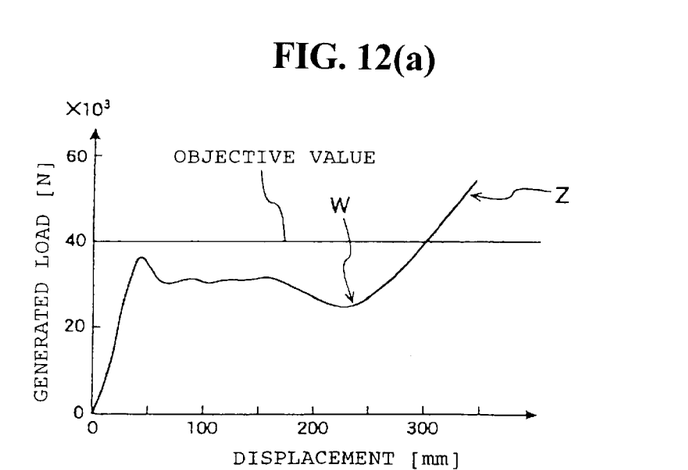
FIG. 12 is a graph showing generated loads with respect to displacement.
Figure 12B:
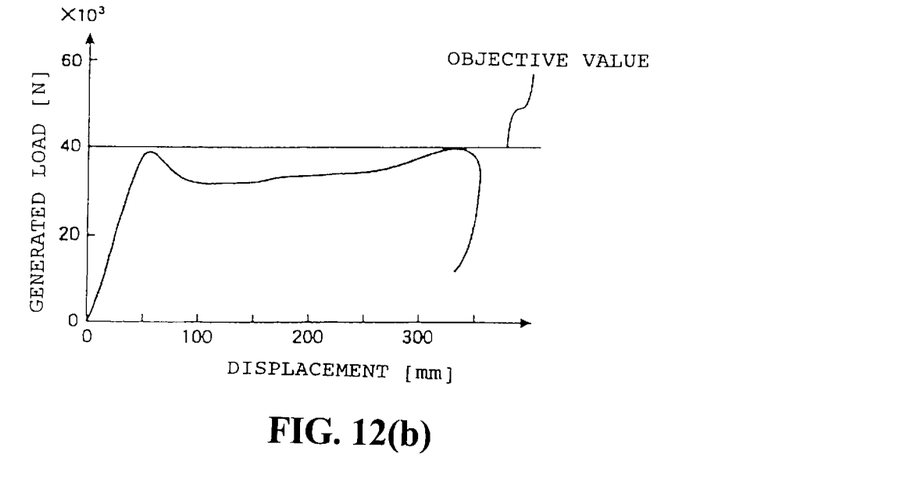

The performance comparative test conducted on making the lattice opening $S_1$ located at the center of the lattice body larger than those located on the portion other than the center will be described. FIG. 12(b) shows the case in which a part of one vertical rib $2a_1$ and a part of two lateral ribs $2a_2$ are thinned out in the central area C as in the present embodiment, and FIG. 12(a) shows the case where they are not thinned out. Without thinning out, the generated load is lowered due to a drop-off of the rib in the state where it was crushed to some extent (point W) as shown in FIG. 12(a). In addition, the generated load increases in the latter half (point Z) by the amount corresponding to the energy that was not absorbed due to drop-off of the plate ribs 2a. In contrast thereto, in the shock absorber formed by stacking the shock absorbing member 1 of which the lattice opening $S_1$ at the center of the lattice body is made larger than those located on the portion other than the center, the generated load with respect to the displacement is stable as shown in FIG. 12(b), and thus the impact of collision is well absorbed. Though it is not shown in the figures, it was recognized that the generated load is stable as in the graph of FIG. 12(b) also when the shock absorber formed by stacking the shock absorbing members 1 of which the lattice opening $S_1$ at the center of the lattice body 2 is made to be larger than those on the portion other than the center as shown in FIG. 5(c) is employed.

Figure 13A:
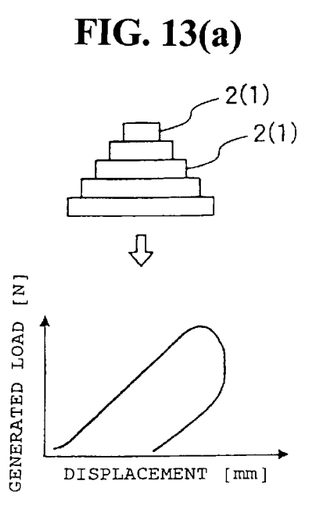
FIG. 13 is a comparative explanatory drawing of the shock absorber.
Figure 13B:
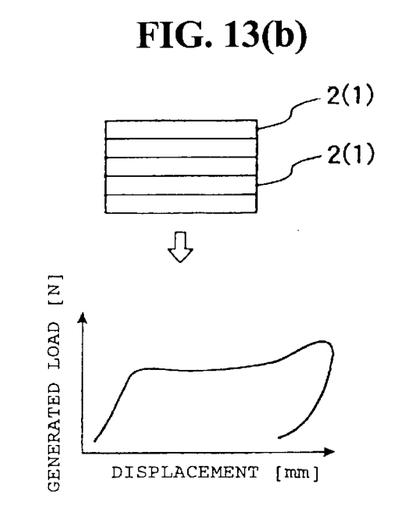

In order to solve the disadvantage in which the plate rib $2a_3$ of the outer peripheral wall can easily be dropped off, such countermeasure that the lattice shock absorbing members 1 in which all the plate ribs 2a are concerned in forming the lattice openings S as shown in FIG. 8(a) are used without forming the projecting rib portions 24 has been considered. In addition, forming the shock absorbing members 1 to be stacked in a pyramid shape as shown in FIG. 13(a) has also been considered. However, when the shock absorbing members 1 are varied in size and are stacked in a pyramid shape, the contact area with respect to the object of collision increases in a crushing process of the shock absorbing member 1 upon reception of an impact load, which results in a generated load increasing in an upward-sloping manner as shown in the figures. This structure is not desirable as a shock absorbing member. Therefore, with the shock absorbing member 1 formed with the projecting rib portions 24 as in the present invention, those in the same size may be stacked, which exhibits a stable generated load without increasing in an upward-sloping manner and superior energy absorbing capability as shown in the graph of FIG. 13(b).

In the shock absorber constructed as described above, since the shock absorbing members 1 having lattice bodies 2 that are stacked in such a manner that the direction of the plate ribs 2a extending from the proximal ends 21 toward the distal ends 22 are oriented along the fore-and-aft direction of the two-wheeled vehicle 9, and the plate ribs 2a are reduced in thickness t gradually from the proximal ends 21 toward the distal ends 22 thereof, the shock absorber can absorb an impact effectively.

In addition, with the shock absorbing members 1 formed with projecting rib portions 24 being stacked and mounted at the front end of the two-wheeled vehicle 9, the impact is received in a well-balanced manner, and thus the generated load may be stabilized, thereby showing its ability satisfactorily on frontal collision of the two-wheeled vehicle 9. Though the front area cannot be made larger for a two-wheeled vehicle, a new foothold was investigated by securing a space in the order of 360 mm in the fore-and-aft direction of the vehicle, and consequently, the problem in that the proximal portion 21 of the plate rib 2a becomes too thick due to a draft angle that must be formed thereon in case of the lattice body 2 in a single-tier construction is solved by stacking the lattice bodies. By employing stacking of the lattice bodies 2 (shock absorbing members 1), a long stroke may be secured, and thus energy may be absorbed to the last moment without increasing the thickness of the plate ribs 2a. Since the shock absorber can be formed by stacking the shock absorbing members 1 in the same size, it contributes to reduce the costs.

Further, with the presence of the top board 3, since the top board 3 receives the impact load as a hole in a first place, and then the load can be dispersed to the respective plate ribs 2a of the lattice body 2 for allowing the plate ribs 2a to be buckled and deformed, the impact can be absorbed further effectively.

Furthermore, by making the lattice opening $S_1$ at the center of the lattice body 2 larger than the lattice openings S located on the portion other then the center, energy can be absorbed to the last moment with a stable generated load even when the shock absorber is formed by stacking the shock absorbing members 1 for absorbing energy in a long stroke. The plate ribs 2a do not drop off even when the stacked lattice bodies 2 (shock absorbing members 1) are crushed, and thus all the ribs may absorb impact energy effectively.

When the projecting rib portions 24 are provided and the lattice opening $S_1$ at the center is made larger than the lattice openings S located on the portion other then the center, a multiplier effect is exercised and thus a large impact of energy may also be absorbed smoothly. In comparison with automotive vehicles, the kinetic energy of 9646 [J] required for frontal collision of the two-wheeled vehicle 9 that requires an incommensurably large energy absorption can be absorbed satisfactorily, which is quite effective.

The present invention is not limited to the above described embodiments, and various modification may be made within the scope of the present invention according to the object and usage thereof. Configurations, dimensions, the number, material and the like of the shock absorbing member 1, the lattice body 2, the top board 3, and the like may be selected appropriately depending upon usage. Though an example in which the shock absorber is mounted on the scooter-type two-wheeled vehicle 9 was shown in FIG. 1, it may also be applied to the delivery-type two-wheeled vehicle and the like.

As is described thus far, the shock absorber for a two-wheeled vehicle according to the present invention is capable of being mounted on the two-wheeled vehicle, and exercises superior effects such that it is capable of absorbing large energy effectively in case of a collision, which is required for a two-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock absorber for a two-wheeled vehicle comprising:
   a tabular top board; and
   a lattice body including a plurality of plate ribs being reduced in thickness from the proximal ends toward the distal ends and molded integrally with the top board so as to project upwardly thereon and intersectionally with respect to each other;
   shock absorbing members of synthetic resin having projecting rib portions being formed at outermost lattice openings of the lattice body by extending a predetermined number of the plate ribs that are disposed intersectionally with respect to each other outwardly and having the top board overhanging outwardly of the outermost lattice openings of the lattice body are disposed in such a manner that a direction of the plate ribs extending from the proximal ends toward the distal ends is oriented along a fore-and-aft direction of the two-wheeled vehicle, stacked in such a manner that the distal ends of the plate ribs abut against the top board of the shock absorbing member to be disposed adjacent thereof, and then mounted at the front end of the two-wheeled vehicle.

2. The shock absorber for a two-wheeled vehicle according to claim 1, wherein the lattice opening at the center of the lattice body is made larger than the lattice openings formed on the portion other than the center.

3. The shock absorber for a two-wheeled vehicle according to claim 1, wherein the lattice body is composed of a plurality of substantially rectangular squares formed by said plate ribs.

4. The shock absorber for a two-wheeled vehicle according to claim 1, wherein a lattice body is formed in substantially a central region of said tabular top board and on an outer peripheral surface of the lattice body are maintained in an open state for enabling a stable crushing of the lattice body.

5. The shock absorber for a two-wheeled vehicle according to claim 4, wherein the central portion includes lattice openings that are larger in size relative to lattice openings disposed adjacent thereto.

6. The shock absorber for a two-wheeled vehicle according to claim 1, and further including a notch formed on the distal end of a predetermined number of plate ribs and a weir formed on an outer surface of said tabular top board, said weir being disposed within said notch when said tabular top board and said lattice bodies are stacked relative to each other.

7. The shock absorber for a two-wheeled vehicle according to claim 6, and further including at least one projecting strip formed on said outer surface of said tabular top board and at lease one claw formed on a plate rib wherein an opening is formed in said at least one projecting strip for retaining said claw when the tabular top board and the lattice bodies are stacked relative to each other.

8. The shock absorber for a two-wheeled vehicle according to claim 7, and further including at least one aperture and at least one rectangular aperture formed in said projecting strip said at lease one claw being mounted in said at least one rectangular aperture and a pin being disposed within said at one aperture for preventing misalignment when the tabular top board and the lattice bodies are stacked relative to each other.

9. The shock absorber for a two-wheeled vehicle according to claim 1, and further including relieves formed in said tabular top board for preventing an increase in a load from being generated upon impact.

10. The shock absorber for a two-wheeled vehicle according to claim 9, wherein said relieves are formed as apertures in said tabular top board.

11. A shock absorber for a two-wheeled vehicle comprising:
    a top board; and
    a plurality of plate ribs being reduced in thickness from the proximal ends toward the distal ends and molded integrally with the top board so as to project upwardly therefrom and intersectionally with respect to each other, said plurality of plate ribs forming a lattice body;
    said plate ribs being disposed intersectionally with respect to each other outwardly and having the top board overhanging outwardly relative to outermost lattice openings of the lattice body, a direction of the plate ribs extending from the proximal ends toward the distal ends is oriented along the fore-and-aft direction of the two-wheeled vehicle and stacked in such a manner that the distal ends of the plate ribs abut against the top board of the shock absorbing member to be disposed adjacent thereof, said shock absorber being adapted for mounting relative to a front end of a two-wheeled vehicle.

12. The shock absorber for a two-wheeled vehicle according to claim 11, wherein the lattice opening at the center of the lattice body is made larger than the lattice openings formed on the portion other than the center.

13. The shock absorber for a two-wheeled vehicle according to claim 11, wherein the lattice body is composed of a plurality of substantially rectangular squares formed by said plate ribs.

14. The shock absorber for a two-wheeled vehicle according to claim 11, wherein a lattice body is formed in substantially a central region of said top board and on an outer peripheral surface of the lattice body are maintained in an open state for enabling a stable crushing of the lattice body.

15. The shock absorber for a two-wheeled vehicle according to claim 14, wherein the central portion includes lattice openings that are larger in size relative to lattice openings disposed adjacent thereto.

16. The shock absorber for a two-wheeled vehicle according to claim 11, and further including a notch formed on the distal end of a predetermined number of plate ribs and a weir formed on an outer surface of said top board, said weir being disposed within said notch when said tabular top board and said lattice bodies are stacked relative to each other.

17. The shock absorber for a two-wheeled vehicle according to claim 16, and further including at least one projecting strip formed on said outer surface of said top board and at lease one claw formed on a plate rib wherein an opening is formed in said at least one projecting strip for retaining said claw when the top board and the lattice bodies are stacked relative to each other.

18. The shock absorber for a two-wheeled vehicle according to claim 17, and further including at least one aperture and at least one rectangular aperture formed in said projecting strip said at lease one claw being mounted in said at least one rectangular aperture and a pin being disposed within said at one aperture for preventing misalignment when the top board and the lattice bodies are stacked relative to each other.

19. The shock absorber for a two-wheeled vehicle according to claim 11, and further including relieves formed in said top board for preventing an increase in a load from being generated upon impact.

20. The shock absorber for a two-wheeled vehicle according to claim 19, wherein said relieves are formed as apertures in said top board.

* * * * *